United States Patent
Kocsis et al.

(10) Patent No.: US 6,524,646 B2
(45) Date of Patent: Feb. 25, 2003

(54) METHOD FOR RESTORING A SURFACE ON A METAL SUBSTRATE

(75) Inventors: Betty H. Kocsis, Phoenix, AZ (US); Jimmy C. Chan, Granger, IN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/940,218

(22) Filed: Aug. 27, 2001

(65) Prior Publication Data

US 2002/0049263 A1 Apr. 25, 2002

Related U.S. Application Data

(62) Division of application No. 09/500,885, filed on Feb. 9, 2000, now abandoned.
(60) Provisional application No. 60/148,868, filed on Aug. 12, 1999.

(51) Int. Cl.⁷ .................................................. B05C 9/02
(52) U.S. Cl. ........................ 427/142; 427/386; 523/457; 523/458; 524/787
(58) Field of Search .................................. 427/142, 386; 523/457, 458; 524/787

(56) References Cited

U.S. PATENT DOCUMENTS

| | | |
|---|---|---|
| 3,371,052 A | 2/1968 | Hirshfeld |
| 3,639,344 A | 2/1972 | Kinneman |
| 3,769,070 A | 10/1973 | Schilt |
| 3,950,571 A | 4/1976 | McBride et al. |
| 4,066,605 A | 1/1978 | McBride et al. |
| 4,180,166 A | 12/1979 | Batdorf |
| 4,512,175 A | 4/1985 | Kaku et al. |
| 4,662,267 A | 5/1987 | Kaku et al. |
| 5,215,803 A | 6/1993 | Koyama et al. |
| 5,316,790 A | 5/1994 | Chan et al. |
| 5,492,466 A | 2/1996 | Frailey |
| 5,516,548 A | 5/1996 | Chan et al. |
| 5,902,647 A | 5/1999 | Venkataramani et al. |

FOREIGN PATENT DOCUMENTS

| | | |
|---|---|---|
| GB | 1031406 | 6/1966 |
| GB | 1036078 | 7/1966 |

OTHER PUBLICATIONS

Anon: "Hysol ® EA 9394/C–2"; retrieved from the Internet: *www.dexteraero.com*; Online! Oct. 1998, pp. 1–3, XP002154219; Technical data sheet, the whole document.
Anon: "EPON Resin 828"; retrived from the Internet: *www.resins–versatics.com*; Online! pp. 1–10, XP002154220, Technical data sheet, the whole document.
Dexter *Hysol* ® EA 9394/C–2 Data sheet, Oct. 12, 1994.
*Epoxy, Materials Basic*, Carolyn Petersen, Mar., 1994.

*Primary Examiner*—Robert Dawson
*Assistant Examiner*—D. Aylward
(74) *Attorney, Agent, or Firm*—Keith A. Newburry, Esq.

(57) ABSTRACT

A method of restoring a damaged surface of a substrate to a functional condition through a filler material consisting essentially of tungsten disulfide and epoxy resin having a 10:1 ratio by weight. The filler material is cured after being applied to the damaged surface by uniformly raising the temperature to a cure temperature of the epoxy to allow any volatiles to evaporate without the creation of voids in the surface such that the resulting porosity prevents corrosion of the substrate when exposed to aromatic fuels at temperatures of 350 degrees F. The filler material consists of tungsten disulfide and a two part epoxy such as Hysol EA 9394/C-2.

14 Claims, 1 Drawing Sheet

METHOD FOR RESTORING A SURFACE ON A METAL SUBSTRATE

CROSS-REFERENCE TO RELATED APPLICATIONS

This application is a divisional of U.S. patent application Ser. No. 09/500,885, filed Feb. 9, 2000, now abandoned, which claims the benefit of U.S. Provisional Patent Application No. 60/148,868, filed Aug. 12, 1999.

TECHNICAL FIELD

This invention relates to a lubricative coating and filler material for restoring metal surfaces that have been scratched, scored, grooved or otherwise damaged to a functional condition to avoid costly repair procedures and minimizing scrap for metal components and methods for restoring a damaged surface of a substrate to a functional condition through application of a filler material consisting of an epoxy and tungsten disulfide.

BACKGROUND OF THE INVENTION

In the past, when surfaces on metal components were damaged, it was common practice to repair scratches in worn areas by welding or brazing, then machining to restore surfaces to a functional condition.

Even though this type of repair was time consuming and expensive, it was more cost effective than scrapping the metal component. In an attempt to reduce cost, it was suggested that such damaged areas may be repairable through the use of a high performance epoxy material. However, it was not until molybdenum disulfide was added to the epoxy, as disclosed by the method and material in U.S. Pat. No. 3,950,571, that damaged surfaces could be restored practically and economically and especially those metal components that may be exposed to aviation fuel at temperatures above 350 degrees F.

While the molybdenum disulfide modified epoxy repairs are satisfactory for most applications it has been observed that voids may be present in the material applied to repair the damaged surfaces. In order to achieve a smooth and void free surface through the use of molybdenum disulfide modified epoxy, two or three applications are required in order to obtain a nonporous surface and machining is required after each application. Investigation revealed that a major cause of the voids and the resulting porosity in a repaired surface was the evaporation during the curing process of solvents used as a carrier for the modified epoxy mixture. The development of voids and a porous surface should be avoided or minimized in order to achieve maximum structural integrity better wear resistance and to minimize potential leakage problems through the repaired surface.

Upon reviewing the current problems, it was determined that a repair material should exhibit or possess the following properties or characteristics: a low coefficient of friction; minimum porosity; and good resistance to aviation fuel at temperatures above 350 degrees F. Further, when used to repair surfaces such materials should be nonporous, lubricate a surface and provide a machinable coating in a single application to reduce the time involved in making or restoring a surface to a functional condition.

One solution to these problems is to use a filler material consisting of a mixture of tungsten disulfide and a single part epoxy such as Hysol 929NA sold by Dexter Hysol Corporation as disclosed in U.S. Pat. No. 5,316,790. Another solution is to use a filler material consisting of a mixture of tungsten disulfide and a bismalemide such as Hysol EA9369 sold by Dexter Hysol Corporation as disclosed in U.S. Pat. No. 5,516,548. Both of these patents are assigned by the assignee of this patent application and are hereby incorporated by reference.

A disadvantage to these solutions is that Hysol 929NA and Hysol EA9369 are single component, heat activated systems that are thermally unstable during shipment. Because of this thermal instability, special storage and shipping conditions are needed to keep the components at or below 32° F. so as to prevent uncontrollable exothermic reactions.

Accordingly, there is a need for a filler material consisting of a mixture of tungsten disulfide and an epoxy that overcomes the disadvantages of the prior art systems.

SUMMARY OF THE INVENTION

An object of the present invention is to provide a filler material consisting of a mixture of tungsten disulfide and an epoxy that is not exothermic under shipping conditions and therefore is easy to transport and handle.

Another object of the present invention is to provide a method of restoring a damaged and/or worn surface on a metal substrate to a functional condition.

The present invention meets these objectives by providing a method of restoring a damaged surface of a substrate to a functional condition through a filler material consisting essentially of tungsten disulfide epoxy resin having a 10:1 ratio of epoxy to tungsten disulfide. After the filler material is applied to the damaged surface it can be cured at room temperature, and/or heat cured by uniformly raising the temperature to a cure temperature of the epoxy to allow any volatiles to evaporate without the creation of voids in the surface such that the resulting porosity prevents corrosion of the substrate when exposed to aromatic fuels at temperatures of 350 degrees F. The filler material consists of tungsten disulfide and a two part epoxy such as Hysol EA 9394/C-2.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
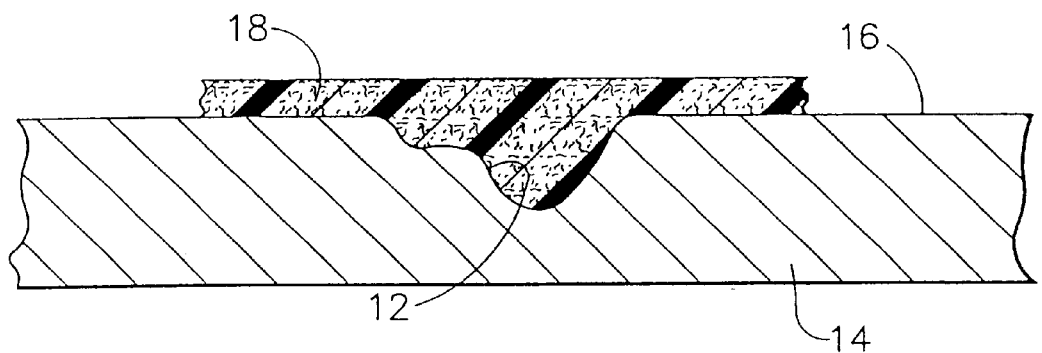
FIG. 1 is a cross-section of a substrate having a filler applied thereto in accordance with the present invention.

In our research for a restoration material, a modified epoxy filler was compounded to produce a mixture of tungsten disulfide ($WS_2$) with a two part epoxy Hysol EA 9394/C-2 that is commercially available from Dexter Hysol Corporation. Hysol EA 9394/C-2 uses a non-aromatic curing agent that retains many of the excellent properties offered by aromatic amine cure systems with a long pot life. It reaches handling strength after 24 hours at room temperature, however, a 1.5 hour ramp and soak cure from room temperature to 200° F. is required to reach maximum strength with minimal porosity. Hysol EA 9394/C-2 is a two part epoxy consisting of a base such as bisphenol A-epichlorohydrin epoxy resin, and polyfunctional epoxy resin plus a catalyst system such as cyclohexanamine and diclohexyl methane-4,4'-diamine. Importantly, both parts are thermally stable meaning they do not have the exothermic properties of the prior art epoxies. As a result they are easy to handle and easy to ship.

Alternatively, if high strength is required and the component cannot be exposed to an oven cure, then a two-part epoxy system that can reach full cure without heat aging can be used. Examples of such system are Hysol 934 and 9394 both commercially available from Dexter Hysol Corporation.

The two parts of the epoxy were mixed in accordance with the manufacturer's instruction, then tungsten disulfide ($WS_2$) was added in a ten parts epoxy to one part tungsten disulfide ratio by weight. The resulting mixture was blended manually for five minutes until uniform in consistency as noted by a uniform gray color. Some overlap shear specimens were prepared according to ASTM D1002 using 2024-T3 aluminum anodized per MIL-A-8625 Type II Class 1, and others were grit blasted 304 CRES stainless steel strips (approximately 75 RMS surface finish). Degreasing consisted of an MEK applied to the specimens just prior to the application of the mixture.

The mixture was applied to a plurality of aluminum and steel test strips and placed in fixture for curing in an oven. The mixture was used to join two test strips together to form an overlap shear test specimen, then cured in a programmed oven according to the following schedule: The temperature in the oven was uniformly raised from ambient temperature to 200° F. in a 30 minute ramp, followed by a one hour soak at 200° F. The ramp step is important because it improves the wetting of the substrate surface while allowing a gradual escape of volatiles from the epoxy, thus minimizing the formation of air pockets or voids which reduce the strength of the material.

Three aluminum specimens were tested in each of the following conditions: Original, after 72 hours in Jet A fuel and after 72 hours in ASTM Reference Fuel B. Three CRES specimens were tested at each of the following conditions: Original, at 350° F. and at 400° F. Results are summarized in Table 1.

TABLE 1

Test Results, Overlap Shear Strength

| Condition | Overlap Shear Strength | Change | Predominant Failure Mode |
|---|---|---|---|
| Unaged aluminum | 1586 psi | — | Adhesion of substrate |
| Aluminum, aged 72 hrs. in Jet A Fuel | 1272 psi | −20% | Adhesion of substrate |
| Aluminum, aged 72 hrs. in ASTM Fuel B | 1213 psi | −24% | Adhesion of substrate |
| Unaged CRES 304 | 3810 | — | Cohesive |
| 304 CRES at 350° F. | 1820 | −52% | Cohesive |
| 304 CRES at 400° F. | 1649 | −57% | Cohesive |

The specimens were examined after the overlap shear strength test for porosity at the fractured epoxy surfaces. No significant porosity was detected under 10× magnification.

To prove that multiple layers can be applied that will adhere to the substrate as well as to itself, a 304 CRES test panel was prepared, coated with the subject tungsten disulfide/epoxy mixture to a thickness of about 0.01 inch and ramp cured as described earlier. Then approximately 0.004 inch of the cured coating was machined off. No de-lamination was observed. A second layer of approximately 0.01 inch of coating was then applied and ramp cured. A second machining operation was then performed to remove another 0.004 inch of coating. Again, no de-lamination was observed.

Figure 2:
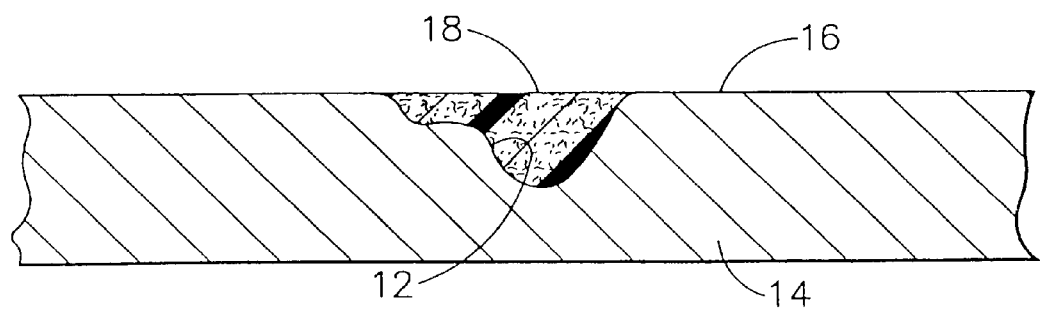
FIG. 2 is a cross-section of the substrate of FIG. 1 repaired in accordance with the present invention.

A method of restoring a damaged and/or worn surface on a metal substrate to a functional condition comprises the following steps. Referring to FIG. 1, a substrate 14 has a surface 16 with a defect 12. The defect 12 is filled with the tungsten disulfide modified epoxy mixture 18 prepared as described earlier in this specification. The temperature of the surface 16 is uniformly raised to cure mixture 18, to allow good surface wetting and to provide for a gradual release of volatiles. In the preferred embodiment, the surface 16 is raised from ambient temperature to 200° F. in a 30 minute ramp, followed by a one hour soak at 200° F. Referring to FIG. 2, excess cured material is machined away to establish a repaired part with a functional surface 20 at the location of the defect 12.

Various modifications and alterations of the above described invention will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A method of restoring a damaged and/or worn surface on a metal substrate to a functional condition, said method comprising the steps of:

a) mixing a filler material comprising tungsten disulfide with nominal particle size of 2 micron or smaller and a two component epoxy having a base resin and a catalyst selected from the group consisting of cyclohexanamine and dicyclohexyl methane-4,4'-diamine to obtain a uniform mixture;

b) applying a quantity of filler material on said damaged and/or worn surface;

c) uniformly raising the temperature of said metal substrate to a cure temperature for said epoxy to allow good surface wetting and to provide for a gradual release of volatiles while allowing proper crosslinking of said mixture without significant porosity thereof; and d) machining any excess cured material from said damaged and/or worn surface to establish said functional surface.

2. The method of claim 1 wherein said cure cycle includes a 0.5 hour ramp from room temperature to a cure temperature of 200° F.

3. The method of claim 2 wherein said uniform mixture comprises ten parts of epoxy to one part tungsten disulfide by weight.

4. The method of claim 2 further comprising after said ramp step the step of soaking said metal substrate for one hour at 200° F.

5. The method of claim 1 further comprising before step (a) the step of forming said epoxy by mixing said base resin and said catalyst.

6. The method of claim 5 wherein said base resin is selected from the group consisting of bisphenol A-epichlorohydrin epoxy and polyfunctional epoxy resins.

7. The method of claim 5 wherein said base resin is selected from the group consisting of bisphenol A-epichlorohydrin epoxy and polyfunctional epoxy resins.

8. The method of claim 1 further comprising soaking said metal substrate and filler material at a temperature up to about 200° F.

9. A method of restoring a damaged and/or worn surface on a metal substrate to a functional condition, said method comprising the steps of:

a) mixing a filler material comprising tungsten disulfide with nominal particle size of 2 micron or smaller and a two component epoxy having a base resin and a catalyst to obtain a uniform mixture;

b) applying a quantity of filler material on said damaged and/or worn surface;

c) curing the applied filler material at a cure temperature up to about 200° F.; and d) machining any excess cured material from said damaged and/or worn surface to establish said functional surface.

10. The method of claim 9 wherein said catalyst is selected from the group consisting of cyclohexanamine and dicyclohexyl methane-4,4'-diamine.

11. The method of claim 9 wherein the applied filler material is cured at room temperature.

12. The method of claim 9 wherein said curing step includes a 0.5 hour ramp from room temperature to a cure temperature of up to about 200° F.

13. The method of claim 9 wherein said uniform mixture comprises at least ten parts of epoxy to one part tungsten disulfide by weight.

14. The method of claim 9 wherein said base resin is selected from the group consisting of bisphenol A-epichlorohydrin epoxy and polyfunctional epoxy resins.

* * * * *